Feb. 7, 1939.  A. CHILTON  2,146,527
RADIAL ENGINE CONNECTING ROD
Filed Nov. 19, 1937
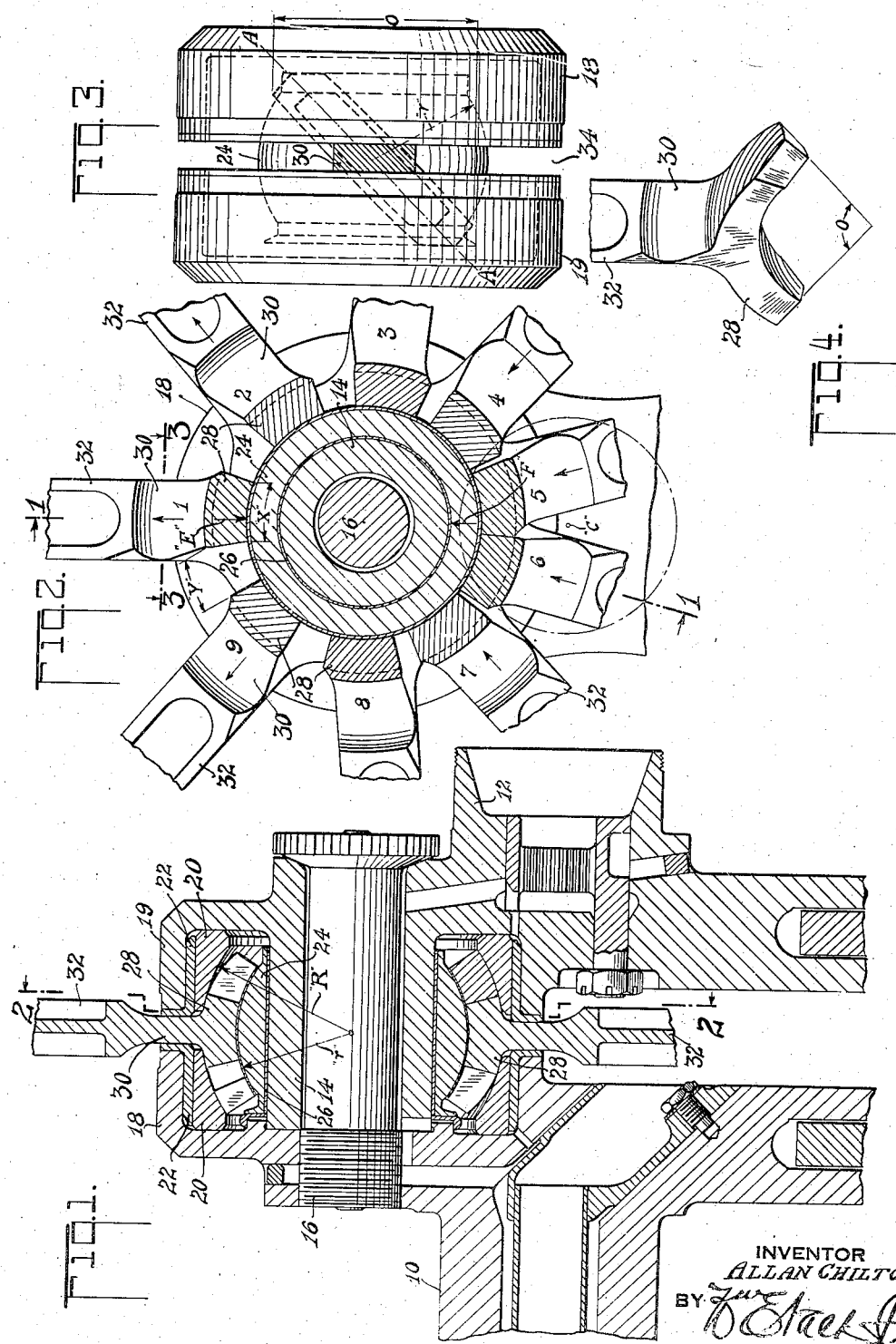
INVENTOR
ALLAN CHILTON
BY
ATTORNEY Patented Feb. 7, 1939

2,146,527

UNITED STATES PATENT OFFICE 2,146,527

RADIAL ENGINE CONNECTING ROD

Allan Chilton, Ridgewood, N. J., assignor to Wright Aeronautical Corporation, a corporation of New York Application November 19, 1937, Serial No. 175,543

7 Claims. (Cl. 74—580)

This invention comprises an improved form of "true motion" connecting rod for radial engines and in certain respects comprises improvements on the co-pending application of Roland Chilton, Serial No. 172,558 filed November 3, 1937.

These rods are of the "slipper type" wherein arcuate slippers engage grooves concentric to the crankpin, the slippers being disposed diagonally to increase their arc of embracement to stabilize the individual rods against tipping and jamming tendencies.

Prior to the above application, the slippers and their engaging grooves have been made cylindrical whereby, with the diagonal slipper disposition, axial forces on the rod produce reactions tending to rotate it about its axis. The co-pending application teaches that, by the use of spherical slippers engaged in spherical tracks, this very undesirable tendency is eliminated, and the rod is self-aligning in that the slippers fit accurately in the grooves even though the rod be slightly twisted or canted.

The co-pending application shows both the inner and outer elements of the slipper engaging grooves formed in a massive bearing member free to rotate around the crankpin. It is a characteristic of this, and the conventional master rod and knuckle pin construction, that the inertia forces of the various rods act cumulatively upon the crankpin bearing. In current radial aircraft engines, the aggregate force acting radially outwards of the crank arm is greater than the explosion force of one piston, wherefrom it results that the crankpin bearing member is continuously loaded against the inner side of the crankpin, the outer side of the bearing having "clearance" even when the rod on that side is subject to explosion load.

The present invention teaches a novel disposition wherein the inertia forces of only half of the rods devolves on the crankpin bearing, since the outer slipper tracks are formed as floating rings, bearing individually in annuli rigid with the crankshaft itself, instead of being part of the crankpin bearing member, as in the above mentioned application. This novel disposition more than doubles the gross effective bearing area and causes the inertia of half of the rods to be taken by the additional bearing surface directly on the crankshaft itself without loading the crankpin bearing per se. The crankpin bearing member itself becomes a relatively light cylindrical bushing having a spherical back on which the slippers bear and its centrifugal force is, accordingly, greatly reduced, again reducing the load on the crankpin bearing.

A further advantage inheres in the result that, under these conditions, the gross centrifugal and ineria forces acting on the crankpin bearing become less than the explosion force on one piston and, accordingly, the loads on the crankpin bearing now reverse. It is well known that the lubrication conditions in a bearing subject to reversing loads are much more favorable than when a unidirectional load is continuously present, and such alternating loads greatly increase the specific pressure which the bearing may safely carry.

Summarizing these objectives and advantages; the inertia forces for half of the rods are completely removed from the crankpin bearing and taken by external rings rigid with the crankshaft. These rings are one of the heaviest elements imposing centrifugal forces in conventional construction whereby the crankpin inertia loads are herein further reduced, until they become less than the explosion loads whereby the bearing is now subject to alternating loads giving a further substantial increase in bearing capacity.

It will be understood that the general object of the slipper construction is to obtain a "true motion" structure wherein the movement of and forces on all of the pistons are identical and symmetrical, in contra-distinction to the conventional master rod and knuckle pin construction, wherein the swing of the master rod imposes elliptical paths of travel on the knuckle pins, from which it results that the various pistons have different strokes and accelerations which introduce complicated unbalanced shaking and torque forces of various orders.

Other objects and advantages will be obvious from, or will be pointed out in, the following description with reference to the drawing in which;

Fig. 1 is a fragmentary axial section through the journal and crankpin axis of the invention on the line 1—1 of Fig. 2.

Fig. 2 is a fragmentary section on the line 2—2 of Fig. 1;

Fig. 3 is a fragmentary section on the line 3—3 of Fig. 2, and

Fig. 4 is a detail view of a slipper.

In this drawing 10 designates a front crankshaft portion to which a rear crankshaft portion 12, having a crankpin 14, is clamped by a large central bolt 16. The crankshaft portions 10 and 12 are provided with integral annular rings 18 and 19 in which are floatingly disposed outer bearing rings 20, for which bushings 22 may be provided. The inner surfaces of the rings 20 are formed spherically as indicated by the radius R. Within the rings 18 and 19 is a crankpin bearing member 24 having the usual cylindrical bearing lining 26 floatingly engaging crankpin, and an external spherically formed surface of radius r.

Fitted between the spherical surface of the bushing 24 and the spherical surfaces of the floating rings 20, are spherical segmental slippers 28 formed integral with flatted shanks 30 which are in turn integral with rods 32, nine of which are indicated and all of which are identical.

Referring now to the plan view of Fig. 3, wherein the shank 30 is shown in section, it will be seen that this is guided in the narrow space 34 formed between the rings 18 and 19 integral with the crankshaft. The long slipper axis A—A is disposed at an angle to the crankpin axis whereby the effective arc of embracement of the slipper in its direction of travel is that indicated in the detail view of Fig. 4 by the angle O, also seen in plan projection in Fig. 3, thus giving a long base for stabilization of the rod, for which purpose the actual arcuate width of the slipper in transverse section indicated at X of Fig. 2 would obviously be inadequate. It will be understood that this width is limited by the clearance Y necessary for the relative swing of the rods whereby the available sectional slipper width X gets smaller as the number of cylinders are increased.

Referring now to Fig. 2, the crankpin rotates around the crankshaft center C and the crankpin bearing is loaded as follows: Firstly, by centrifugal force F due to the weight of the bushing 24 acting radially outwards. The weight of this bushing 24 is only a fraction of the weight of the "big end" of a conventional master rod. Secondly, by inertia forces on the rods 4, 5, 6 and 7 the summation of which also acts radially outwards.

The inertia forces of the rods 1, 2 and 9, however, devolve upon the rings 20. The bushing 24, accordingly, is relieved of this source of load, to which it is subject in conventional construction. As drawn, #1 rod is in firing position and when the explosion load occurs, it acts radially inwards (as indicated by the arrow E) and is in excess of the summation of the inertia and centrifugal forces of 1, 7, 6, 5, 4 and F, so that the resultant load on the crankpin bushing 24 will be reversed, when explosion occurs, from acting radially outwards to acting radially inwards. This will occur four and a half times per revolution in a 9-cylinder 4 cycle engine. The crankpin bushing is, accordingly, alternately loaded on opposite sides, the duration of load on any one side being less than 1/100 second, which is known to be a very favorable condition as compared with the continuous load on the inside of the crankpin in conventional constructions, wherein centrifugal and inertia forces of all the connecting rod and crankpin bearing structure act substantially unidirectionally with respect to the crankpin.

It will also be seen that the addition of the exterior bearings 22 of the floating rings 20 serve to distribute the various loads over a very much greater bearing area than in conventional constructions, wherein they would all devolve on the crankpin bearing 24.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

I claim as my invention:

1. In combination, a crankshaft having a crankpin and annular members surrounding and integral with the crankpin, bushings floatingly engaging said pin and annulus and defining sphericalized slots, and connecting rods having slippers slidable in said slots.

2. The combination with a crankshaft having a crankpin and rings surrounding said crankpin rigid with said shaft, of an inner bearing engaging said pin and having a spherical outer surface, floating ring journalled in said rigid rings and having inner faces spherically concentric with the spherical surface of said bearing, and a plurality of rods having slippers slidably fitted in the annuli defined by said spherically formed bearings.

3. In combination with a crankshaft having a crankpin and annular members surrounding and integral with the crankpin, bushings floatingly engaging said pin and annuli and defining sphericalized arcuate slots, and connecting rods having elongated slippers fitted in said slots, with their long dimension diagonal of the bushings.

4. In combination, a crankshaft having rigid therewith a pair of opposed rings and a crankpin rigid with said rings, bushings having opposed sphericalized faces and rotationally bearing upon said crankpin and rings respectively, a connecting rod having a shank adapted to swing between said rings and an elongated sphericalized slipper fitted between said bushings extending with its elongated dimension helically of the crankpin axis.

5. In combination, inner and outer floating bushings having concentric spherical faces defining an annulus, a rod having a spherical slipper slidable in said annulus, and a crankshaft including rigid therewith a crankpin and ring members bearing rotationally upon respective bushings.

6. In combination, a crankshaft having a crankpin and annular members surrounding and integral with the crankpin, bushings floatingly engaging said pin and annuli defining annular slots between the bushings, and connecting rods having slippers slidable in said slots.

7. In combination, inner and outer floating bushings having concentric faces defining an annular slot, a rod having a segmental slipper slidable in said annulus, and a crankshaft including an integral crankpin and an integral ring member on which respective bushings are rotationally borne.

ALLAN CHILTON.